N. B. WEBSTER & R. W. YOUNG.
PREVENTION OF INCRUSTATION IN STEAM BOILERS.
No. 2,371. Reissued Oct. 2, 1866.
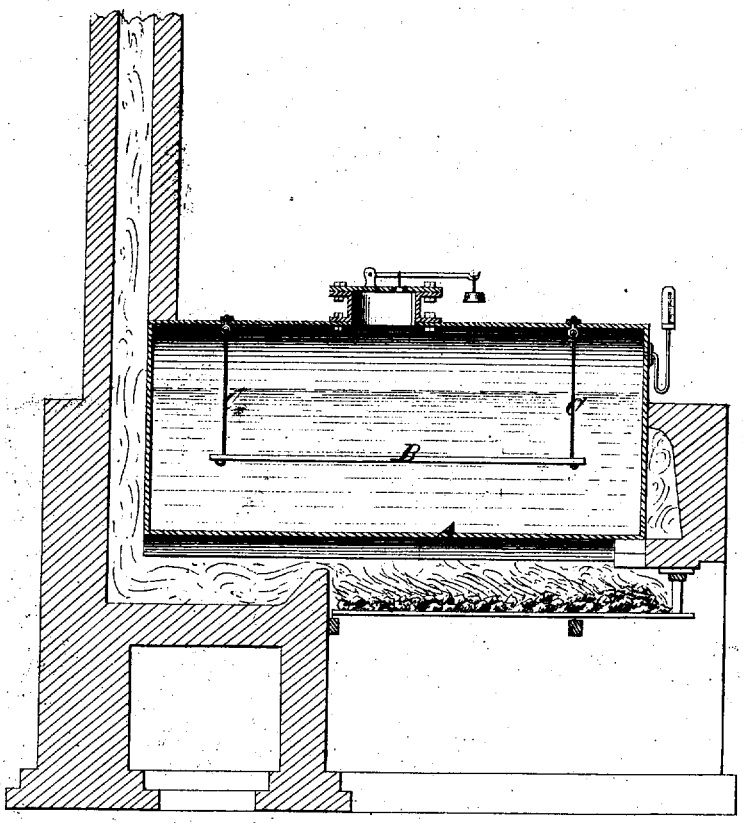
Witnesses, as to Webster { J. H. Purdy, A. S. Maguire.
Witnesses as to Young { George Bartle, John P. Polk
N. B. Webster
R. W. Young

UNITED STATES PATENT OFFICE.

N. B. WEBSTER, OF PORTSMOUTH, AND ROBERT W. YOUNG, OF RICHMOND, VA.

IMPROVEMENT IN PREVENTION OF INCRUSTATION IN STEAM-BOILERS.

Specification forming part of Letters Patent No. 30,511, dated October 23, 1860; Reissue No. 2,371, dated October 2, 1866.

*To all whom it may concern:*

Be it known that we, NATHAN B. WEBSTER and ROBERT W. YOUNG, late of Portsmouth, in the county of Norfolk and State of Virginia, (the said WEBSTER being now a temporary resident of Ottawa. Canada West, and the said YOUNG being a resident of Richmond, Virginia,) have invented a new and useful Improvement for Preventing Incrustation in Steam-Boilers; and we do hereby declare the following to be a full and exact description thereof.

Our invention has for its object the prevention of the incrustation of steam-boilers; and it consists in connecting with the shell of the boiler a metal electro-negative in reference to said boiler, and connected with said boiler by a conductor in such manner that an electric action shall take place within said boiler, the interior of said boiler being then made electro-positive.

The annexed drawing exhibits a convenient mode of attaching the electro-negative metal, in which B is the electro-negative plate, attached by connections C with the boiler-shell. If the boiler is iron, copper would answer as an electro-negative metal, and we prefer to place the metal within the liquid.

We do not propose to define the precise rationale of the electric action which takes place, as that is a matter not yet settled among men of science; neither do we limit ourselves to the use of any special electro-negative metal, or to the special manner of insertion or connection of such electro-negative metal to the boiler, as this will be evident to any one skilled in electro-metallurgy; but What we do claim as our invention, and desire to secure by Letters Patent, is—

The connecting, with the interior of a steam-boiler, of a metal electro-negative to the boiler for the purpose of preventing incrustation in the steam-boiler.

N. B. WEBSTER.
R. W. YOUNG.

Witnesses to signature of N. B. Webster:
WILLIAM CARLETON,
GEO. HAWKINS.

Witnesses to signature of R. W. Young:
OCTAVIUS KNIGHT,
JAMES L. EWIN.